United States Patent [19]

Knight, Jr. et al.

[11] 4,187,738
[45] Feb. 12, 1980

[54] RIM FOR ROTARY INERTIAL ENERGY STORAGE DEVICE AND METHOD

[75] Inventors: Charles E. Knight, Jr., Knoxville; Roy E. Pollard, Powell, both of Tenn.

[73] Assignee: The United States of America as represented by the Department of Energy, Washington, D.C.

[21] Appl. No.: 904,676

[22] Filed: May 10, 1978

[51] Int. Cl.$^2$ .................... F16F 15/30; F16C 15/00
[52] U.S. Cl. ..................................... 74/572; 74/573 R
[58] Field of Search ........................... 74/572, 573, 574

[56] References Cited

U.S. PATENT DOCUMENTS

| | | | |
|---|---|---|---|
| 3,964,341 | 6/1976 | Rabenhorst | 74/572 |
| 3,977,273 | 8/1976 | Ernst et al. | 74/572 |
| 4,036,080 | 7/1977 | Friedericy et al. | 74/572 |

OTHER PUBLICATIONS

"Proceedings of the 1975 Flywheel Technology Symposium", Lawrence Hall of Science, Berkeley, Cal., Nov. 10-12, 1975.

Primary Examiner—Carroll B. Dority, Jr.
Assistant Examiner—Randall L. Green
Attorney, Agent, or Firm—R. V. Lupo; Stephen D. Hamel; Earl L. Larcher

[57] ABSTRACT

The present invention is directed to an improved rim or a high-performance rotary inertial energy storage device (flywheel). The improved rim is fabricated from resin impregnated filamentary material which is circumferentially wound in a side-by-side relationship to form a plurality of discretely and sequentially formed concentric layers of filamentary material that are bound together in a resin matrix. The improved rim is provided by prestressing the filamentary material in each successive layer to a prescribed tension loading in accordance with a predetermined schedule during the winding thereof and then curing the resin in each layer prior to forming the next layer for providing a prestress distribution within the rim to effect a self-equilibrating compressive prestress within the windings which counterbalances the transverse or radial tensile stresses generated during rotation of the rim for inhibiting deleterious delamination problems.

5 Claims, 4 Drawing Figures

RIM FOR ROTARY INERTIAL ENERGY STORAGE DEVICE AND METHOD

BACKGROUND OF THE INVENTION

The present invention is directed generally to the fabrication of rotary inertial energy storage devices, and more particularly to an improved rim for use in such energy storage devices. This inventon was made in the course of, or under, a contract with the U.S. Department of Energy.

Rotary inertial energy storage devices are receiving increasing interest in applications where energy storage can be beneficially and efficiently utilized. These devices or flywheels are generally formed of a centrally disposed hub which is fixed through suitable drive means to an energy input means for rotating the flywheel to suitable energy storage speeds and to a point of use for the stored energy. Circumferentially spaced from and concentrically disposed from the hub is a rim which is the mechanism for storing the inertial energy. This rim may, in turn, be coupled to the hub by a suitable spoke arrangement such as provided by windings or belts of filamentary material. The flywheel technology has significantly advanced during recent times especially in the area of rim fabrication wherein anisotropic filamentary materials, such as fiberglass, carbon and polyaramid fibers, have been successfully utilized and which offer significant advantages since they have a substantially greater strength-to-density ratio than high grade steel utilizable in flywheel construction. Filamentary materials of the aforementioned type are normally wound about a mandrel and bonded together into a single body to define the rim. However, while the filamentary materials can sustain high stresses along their longitudinal axis, significant stresses are encountered in directions perpendicular to the longitudinal axis of the filamentary material during the rotational movement of the flywheel which may cause premature failure of the rim. The stress on a free thin hoop of the wound filament varies as the square of the distance of the filament from the center of rotation with the strain being proportional to this stress. In a thick rim the outer filaments are being held back by the inner filaments while simultaneously the inner filaments are being pulled out by the outer filaments. This produces radial tensile stresses in the rim which can not be reliably supported by most filamentary composites. For example, with a rim having an inside radius of about three-fourths of its outside radius, the outermost filaments in their "free" state would strain approximately 1.8 times as much as the filaments on the inside radius of the rim. With rims of greater radius ratios the strain ratio of the outer filaments is even greater so as to induce considerably more radial tensile stress through the rim wall. This difference in strain of filaments at these locations on a rim causes the filament wound flywheel to delaminate and, in effect, break into a plurality of concentric rings at a rotational velocity considerably less than that which the ring can reach before the filaments reach their maximum tensile stress.

SUMMARY OF THE INVENTION

Accordingly, it is the primary objective or aim of the present invention to provide an improved rim for use in inertial energy storage devices which is capable of minimizing or obviating the delamination problems heretofore encountered in filament wound rims. The improved rim for providing or achieving the aforementioned goal comprises a plurality of concentrically disposed and abutting layers of filamentary material in a resin matrix with the resin bonding together the filaments in each layer as well as the adjacent layers of filamentary material. The layers forming the rim are characterized by being discretely and sequentially formed by winding the resin impregnated filamentary material in a circumferential side-by-side pattern with the resin impregnant being cured prior to the application of each succeeding layer. With the filamentary material in each layer extending from the radially innermost layer to the radially outermost layer being applied with increasing winding tension, a self-equilibrating force is provided in the winding which counterbalances the radial tensile stresses generated by the angular speed. This counterbalancing effectively inhibits the delamination of the winding layers by building in a radial compressive prestress distribution which is reliably supported by filamentary composites so that all the radial tensile stress that would be generated up to the design speed is essentially canceled by the compressive prestress.

Other and further objects of the invention will be obvious upon an understanding of the illustrative embodiment about to be described or will be indicated in the appended claims, and various advantages not referred to herein will occur to one skilled in the art upon employment of the invention in practice.

The graphs and flywheel rim illustrated in the drawings are chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

Described generally, the present invention is directed to the fabrication of a prestressed flywheel rim which effectively prevents the delamination of the filamentary material from occurring during rotational speeds as high as 35,000 revolutions per minute. The rim of the present invention is constructed of filament-wound material in which a plurality of discrete separately formed layers are bonded together in a resin matrix.

Figure 1:
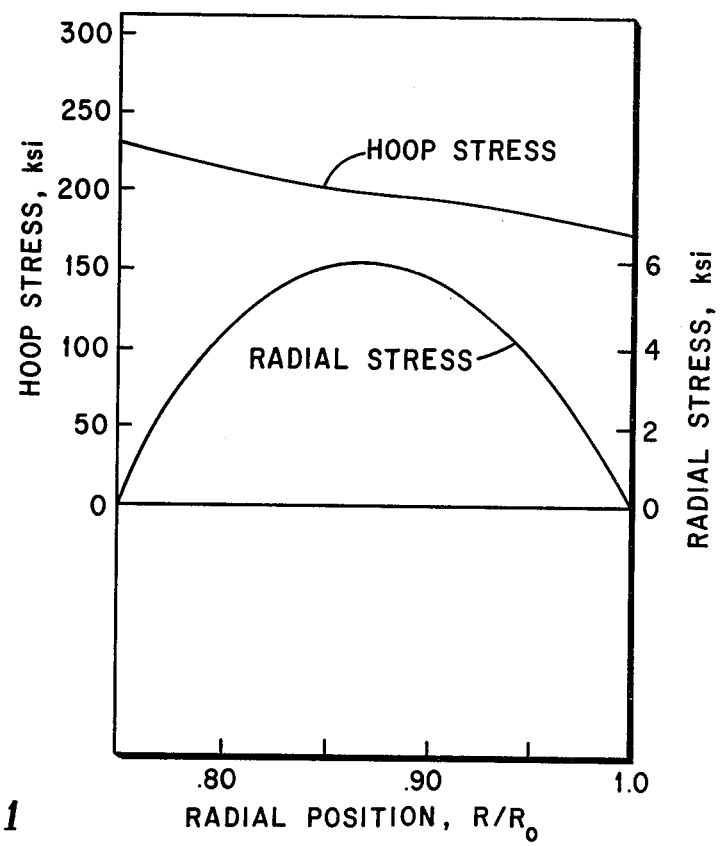
FIG. 1 is a graph illustrating radial and hoop stresses exerted on a rim as heretofore formed of a highly orthotropic composite of high strength organic filament in an epoxy resin matrix.
Figure 2:
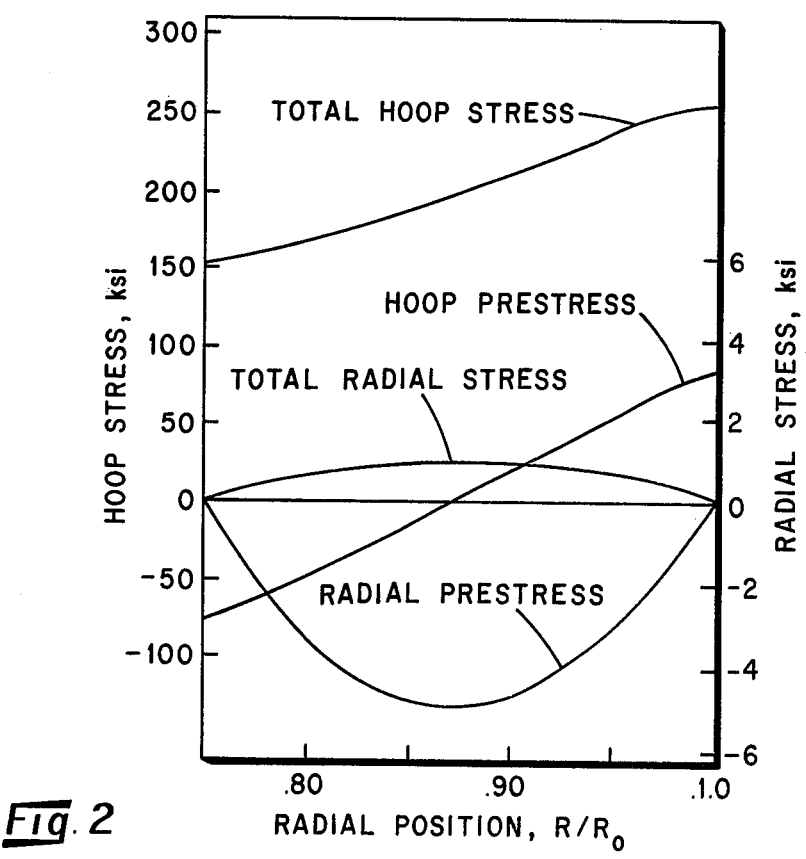
FIG. 2 is a graph showing ideal radial prestresses together with total stresses generated in a rotating rim. This drawing illustrates the distribution for hoop prestress existing when the ring is at rest. As the rotational speed of the rim is increased the rotational stresses are built or grow to the level shown in FIG. 1 with these stresses being elastic so that superposition may be applied to form the total hoop and radial stress distributions.

Briefly, the invention comprises the winding of the filamentary material in each of a plurality of radially, concentrically oriented layers of resin impregnated filamentary material at a prescribed level of tension in each layer with the winding tension increasing in each succeeding layer. The first layer is wound on a mandrel and then each succeeding layer is wound on the layer most recently formed. After the filamentary material in each layer is circumferentially wound in a side-by-side orientation to a predetermined layer thickness and width the resin in the layer is cured to provide a retained tensile stress in the filamentary material in the layer as well as to bond the layer to the previously formed layer about which the filamentary material is wound. This rim which is constructed in discrete one-layer operations provides a mechanism wherein a retained tensile stress in each layer is modified with the application of each subsequent layer. The resulting plurality of stressed layers result in the scheduled or predetermined prestressed distribution in which the radial compressive stress in each layer counterbalances the radial stresses generated by the angular speed of the rotating rim. The radial and hoop stresses shown in FIG. 1 which are normally encountered in filament-wound flywheel rims as previously constructed are significantly changed by employing a radial prestress approaching the ideal radial prestress (FIG. 2) as afforded by practicing the present invention so as to provide radial and hoop stresses which will effect deleterious delaminations of the windings.

Figure 4:
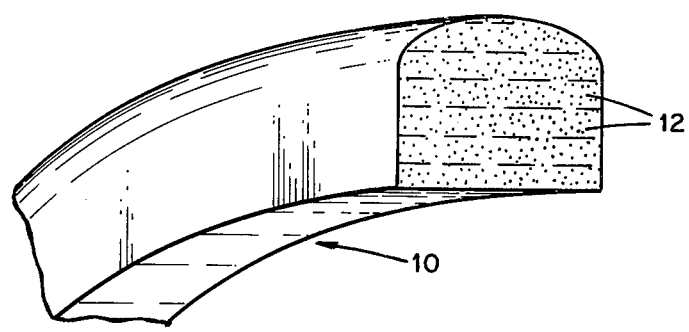
FIG. 4 is a fragmentary sectional view of a flywheel rim constructed of a plurality of discretely formed prestressed layers of filamentary material in accordance with the teachings of the present invention.

The number of layers of filamentary material used to form the rim depends primarily upon how closely the prestress distribution needs to fit the inverse of the applied stress distribution. Also, the filamentary materials and resin being used as well as their processing requirements have to be considered in the determination of the number of layers. A minimum of two layers may be used but the more layers the better the prestress distribution. Usually, about ten layers should be satisfactory for most rim fabrications. The thickness of the layers may range from a single ply thickness up to about one-half inch. A typical flywheel rim constructed in accordance with the teachings of the present invention is shown in FIG. 4. The rim 10 comprises a plurality of concentrically disposed layers 12 of the filament-wound material. Each layer 12 is securely bonded to one or more adjacent layers in contact therewith and would appear in an actual flywheel rim as a single layer throughout the cross section thereof. However, for the purpose of illustration the flywheel rim 10 is shown with visually identifiable separate layers 12.

In order to determine the prestress applied to each layer of the multilayer rim of the present invention, the formula described in the publication "Residual Stresses in Filament-Wound Laminates and Optimum Programmed Winding Tension" by Y. Liu and C. C. Chamis preceding section 5-D of the twentieth annual meeting of the Society of the Plastic Industry, 1956 may be utilized. While this formula as set forth below is sufficient for providing the tension in each layer, the formula must be recalculated for each succeeding layer in order to provide the necessary self-equilibrating forces for counterbalancing the radial stresses as provided by the multilayered rim of the present invention.

$$\sigma_r = \frac{2sb^{2s}c^{s-1}f(b)}{c^{2s} - b^{2s}}\left[\left(\frac{c}{r}\right)^{s+1} - \left(\frac{r}{c}\right)^{s-1}\right] -$$

$$b^{s-1}\left[\alpha\left(\frac{b}{r}\right)^{s+1} + \beta\left(\frac{r}{b}\right)^{s-1}\right]f(r), \text{ and}$$

$$\sigma_\theta = T(r) - \frac{2s^2b^{2s}c^{s-1}f(b)}{c^{2s} - b^{2s}}\left[\left(\frac{c}{r}\right)^{s+1} + \left(\frac{r}{c}\right)^{s-1}\right] +$$

$$sb^{s-1}\left[\alpha\left(\frac{b}{r}\right)^{s+1} - \beta\left(\frac{r}{b}\right)^{s-1}\right]f(r),$$

where:
$\sigma_r$ represents the radial stress,
$\sigma_\theta$ the hoop stress,
$T(r)$ the winding tension as a function of radius,
$E_r$ the radial modulus of the composite,
$E_\theta$ the hoop elastic modulus of the composite,
$E_m$ the elastic modulus of the mandrel material,
a the mandrel inside radius,
b the mandrel outside radius,
c the composite outside radius,
r the radial coordinate,
$\mu\theta r$ the composite Poisson's ratio ($\epsilon_r/\epsilon_\theta$ for applied $\sigma_\epsilon$), and
$\mu_m$ the mandrel Poisson's ratio.
In addition:
s equals $\sqrt{E_\theta/E_r}$.

$B$ equals $\dfrac{E_\theta}{E_m(b^2 - a^2)}[(1 - \mu_m)b^2 + (1 + \mu_m)a^2]$ $\alpha$ equals $s - \mu\theta_r - B$,
$\beta$ equals $s + \mu\theta_r + B$, and $f(r)$ equals $\dfrac{c \rho^s T(\rho)d\rho}{r \beta\rho^{2s} + \alpha b^{2s}}$ (where $\rho$ represents the radial coordinate variable of integration.)

The aforementioned equations can be inverted for calculating the required tensile stress schedule for each layer of a rim from the radial stress distribution exerted on the rim by the angular speed of the rotating flywheel. The prestress required for balancing rotational stress may be adequately provided by a linearly increasing tension schedule extending from the innermost layer to the outermost layer. The extent of tensile stress incorporated in each layer is controlled by the parameters of the process with the final stress level in a layer being a function of the layer thickness and diameter, of the winding tension, the fiber and resin materials, the mandrel stiffness and the process parameters.

In order to provide a more facile understanding of the present invention an Example relating to the fabrication of a typical multilayer flywheel rim in accordance with the present invention is set forth below. The rim in this Example was constructed of a high strength organic filament of the aromatic polyaramid family within an epoxy resin system. The particular filament employed is commercially available as Kevlar, Type 49, produced by E. I. du Pont de Nemours & Company, Inc. The filament strand was 1420 denier. The epoxy resin system was composed of Dow Chemical Company DER-332 resin with a Jeffamine T-403 hardener obtained from the Jefferson Chemical Company.

EXAMPLE

Figure 3:
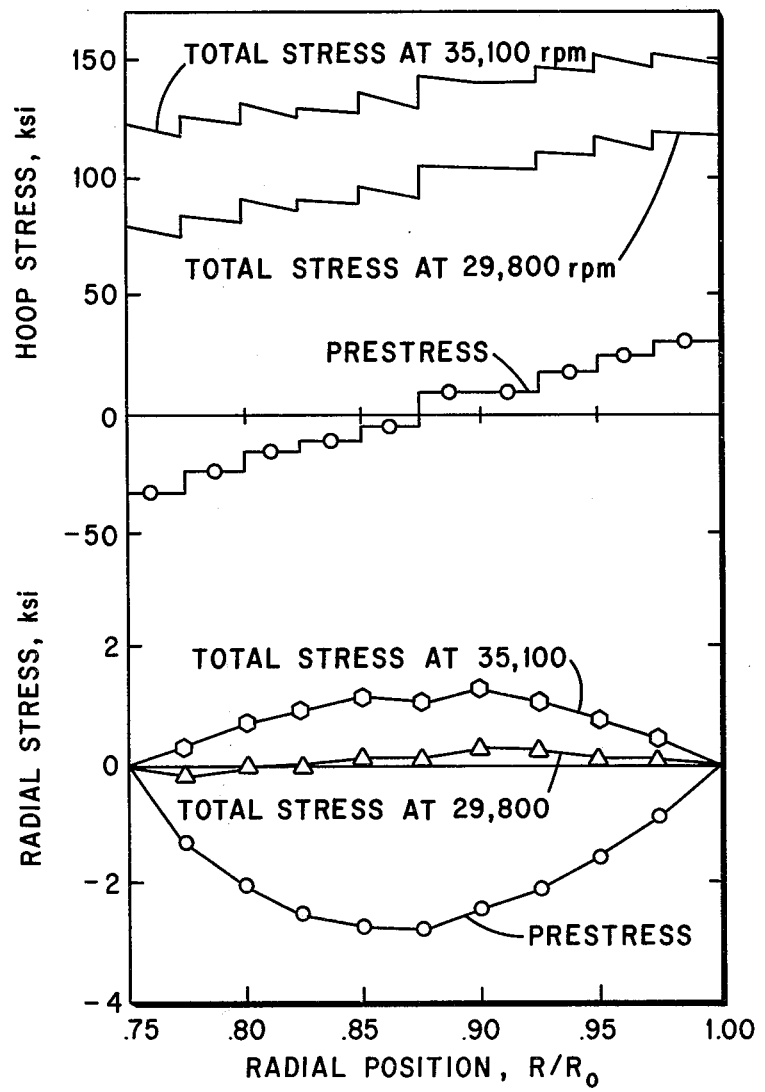
FIG. 3 is a graph illustrating the relationships of the prestress in each of the layers of a multilayer rim constructed in accordance with the teachings of the present invention to the rotational stresses during operation of a flywheel with the rim of the present invention.

The fabrication of the rim was achieved by passing a single length filament through a container of resin for impregnating the filament which was then wound on a Plexiglass mandrel at a tension of 850 grams until a layer 0.25 inch in thickness and 4.0 inches wide was formed. After forming the layer, it was cured at room temperature for two days with a hoop tensile stress of 0.9 ksi being retained in the layer. Then each succeeding layer was similarly wound upon each previous layer under a schedule shown in the Table below to form the multilayer rim of the present invention. As listed in the table the rim had an inside diameter of 7.5 inches and an outside diameter of 10 inches with a width of 4 inches. The total weight of the rim is 23 pounds and a radius ratio of 0.75. The radial stress and the hoop stress as shown in the Table provided a mechanism wherein the retained compressive radial layer stress imposed a self-equilibrating force within the wound structure to effect a counterbalancing mechanism so as to effectively eliminate delamination at the high rotational speeds. As shown in FIG. 3 each of the circular dots shows that the radial prestress is compressive and a speed of 29,800 rpm is reached before any radial tensile stress is developed and at 35,100 rpm delamination failure is eminent. The 23 pound rim rotating at 29,800 rpm utilized for energy storage capacity of 720 watt-hrs. is equal to an energy density of 31 watt-hrs. per pound based on the total weight of the rim. This figure is significantly greater than attainable by rims fabricated by previously known techniques due to the deleterious results suffered by delamination at such radial velocities.

| Applied Winding Tension | Retained Layer Stress (ksi) | | Layer inside Radius | Radial Stress (ksi) | | Hoop Stress (ksi) | |
|---|---|---|---|---|---|---|---|
| (g) | Theoretical | Experimental | (In) | Theoretical | Experimental | Theoretical | Experimental |
| 850 | 0 | 0.9 | 7.50 | 0 | 0 | −30.0 | −33.8 |
| 1400 | 3.9 | 5.7 | 7.75 | −0.96 | −1.33 | −25.4 | −24.3 |
| 1850 | 7.8 | 9.8 | 8.00 | −1.68 | −2.06 | −18.9 | −16.1 |
| 2250 | 11.7 | 12.6 | 8.25 | −2.16 | −2.51 | −12.3 | −10.0 |
| 2700 | 15.6 | 15.1 | 8.50 | −2.41 | −2.71 | −5.7 | −4.5 |
| 3150 | 19.5 | 25.4 | 8.75 | −2.46 | −2.76 | 1.0 | 10.2 |
| 3550 | 23.4 | 21.3 | 9.00 | −2.32 | −2.40 | 7.9 | 9.1 |
| 4000 | 27.2 | 28.0 | 9.25 | −2.00 | −2.09 | 15.1 | 19.5 |
| 4450 | 31.1 | 29.6 | 9.50 | −1.51 | −1.54 | 22.6 | 25.1 |
| 4950 | 35.0 | 31.7 | 9.75 | −0.84 | −0.83 | 30.4 | 31.3 |
| | | | at r = 10.00 | 0 | 0 | 34.8 | 31.3 |

It will be seen that the present invention sets forth a mechanism by which rims of rotational energy storage devices may be readily fabricated from circumferentially wound filamentary material without suffering the delamination problems encountered during high rotational speed due to radial growth of the outermost part of the rim with respect to the innermost part. The self-equilibrating force provided by the prestress in each layer of the multi-layer composite counterbalances the radial forces so as to provide a compressive radial stress in the operating speed range throughout the entire thickness of the multilayered rim.

What is claimed is:

1. An improved rim for a rotary inertial energy storage device, said rim comprising a plurality of concentrically disposed and abutting layers of filamentary material in a resin matrix with said resin bonding together adjacent layers of filamentary material, said layers being characterized by being discretely and sequentially formed by winding a resin impregnated filamentary material in a circumferential side-by-side pattern with the resin impregnant being cured prior to the application of each succeeding layer and with the filamentary material in each layer extending from the radially innermost layer to the radially outermost layer being applied with a greater and sufficient winding tension to provide a different residual stress within each of the wound layers adequate for counterbalancing the radial stresses generated during the rotation of the rim throughout the entire radial thickness of the multilayers and thereby providing sufficient stretching of the filamentary material in each of the layers to inhibit deleterious delamination during rotation.

2. The improved rim claimed in claim 1 wherein the filamentary material is a polyaramid fiber, and wherein the resin is an epoxy resin.

3. A method for fabricating an improved rim for an inertial energy storage device comprising the steps of winding resin impregnated filamentary material at a preselected tension in a circumferential side-by-side pattern a sufficient number of revolutions to provide a toroidally shaped layer of filamentary material of a thickness corresponding to a dimension wherein a plurality of such layers disposed concentrically are required to provide the final thickness of the rim, curing the resin in said layer, and thereafter winding one or more layers of resin impregnated filamentary material on the first mentioned layer with the filamentary material in each of said one or more layers being wound at a predetermined tension greater than the first mentioned layer and any previously wound layer, and curing the resin in each layer prior to winding the next layer for bonding together the wound layers and providing a residual stress at a different level in each of said layers, said predetermined tensions for winding the filamentary material being sufficient to provide a self-equilibrating force in said rim for counterbalancing the radial stresses during rotation of the rim to assure that the strain of the filamentary material in each of said layers is compatible so as to inhibit delamination of the rim during rotation.

4. The method claimed in claim 3, wherein the filamentary material is a polyaramid fiber and wherein the resin is an epoxy resin.

5. The method claimed in claim 4, wherein said resin is cured in air at room temperature.

* * * * *